March 26, 1957 C. L. DAY ET AL 2,786,601
CONTAINER FILLING APPARATUS
Filed Dec. 13, 1954 7 Sheets-Sheet 4
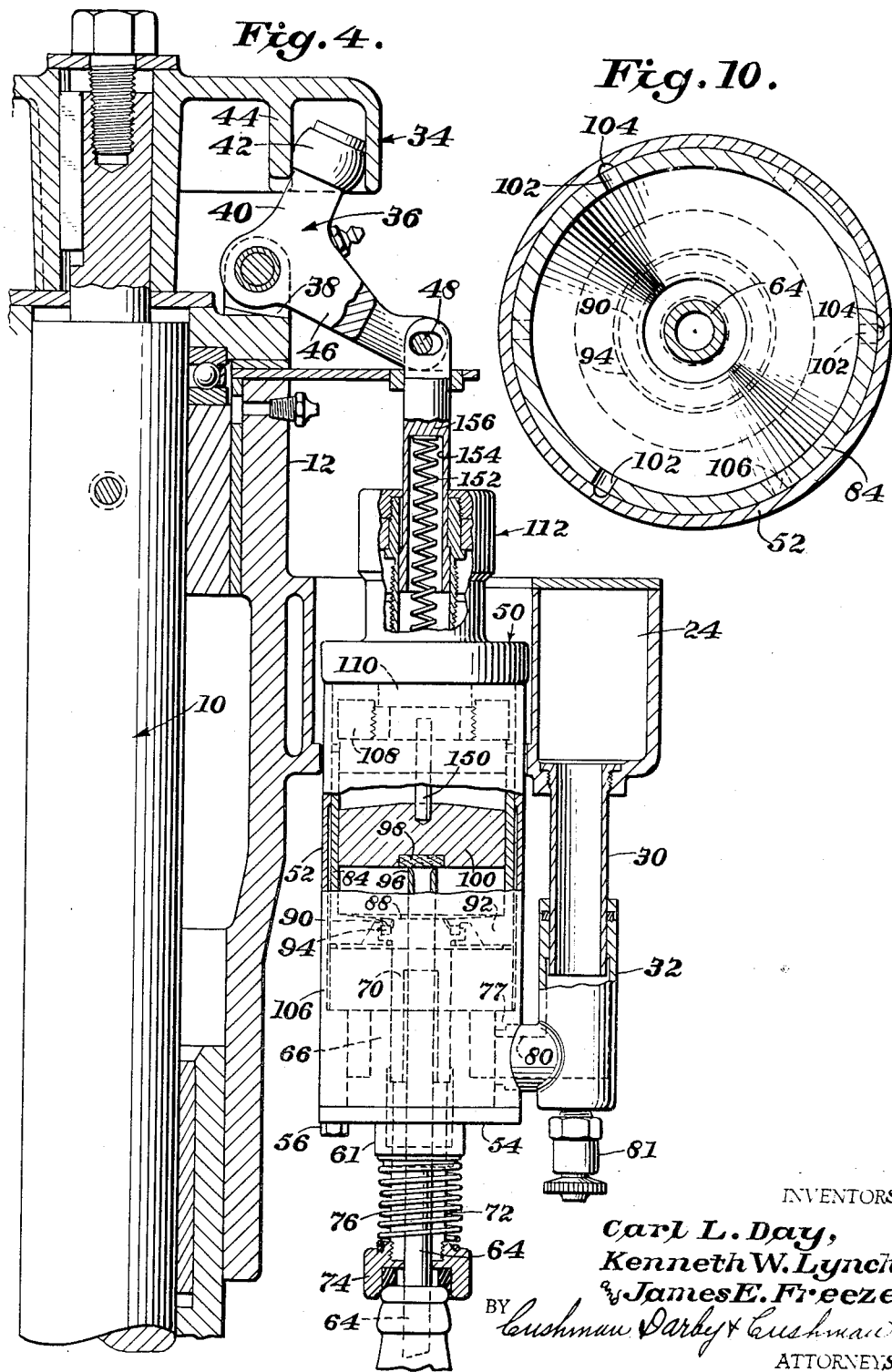
INVENTORS:
Carl L. Day,
Kenneth W. Lynch,
& James E. Freeze,
BY Cushman Darby & Cushman
ATTORNEYS.

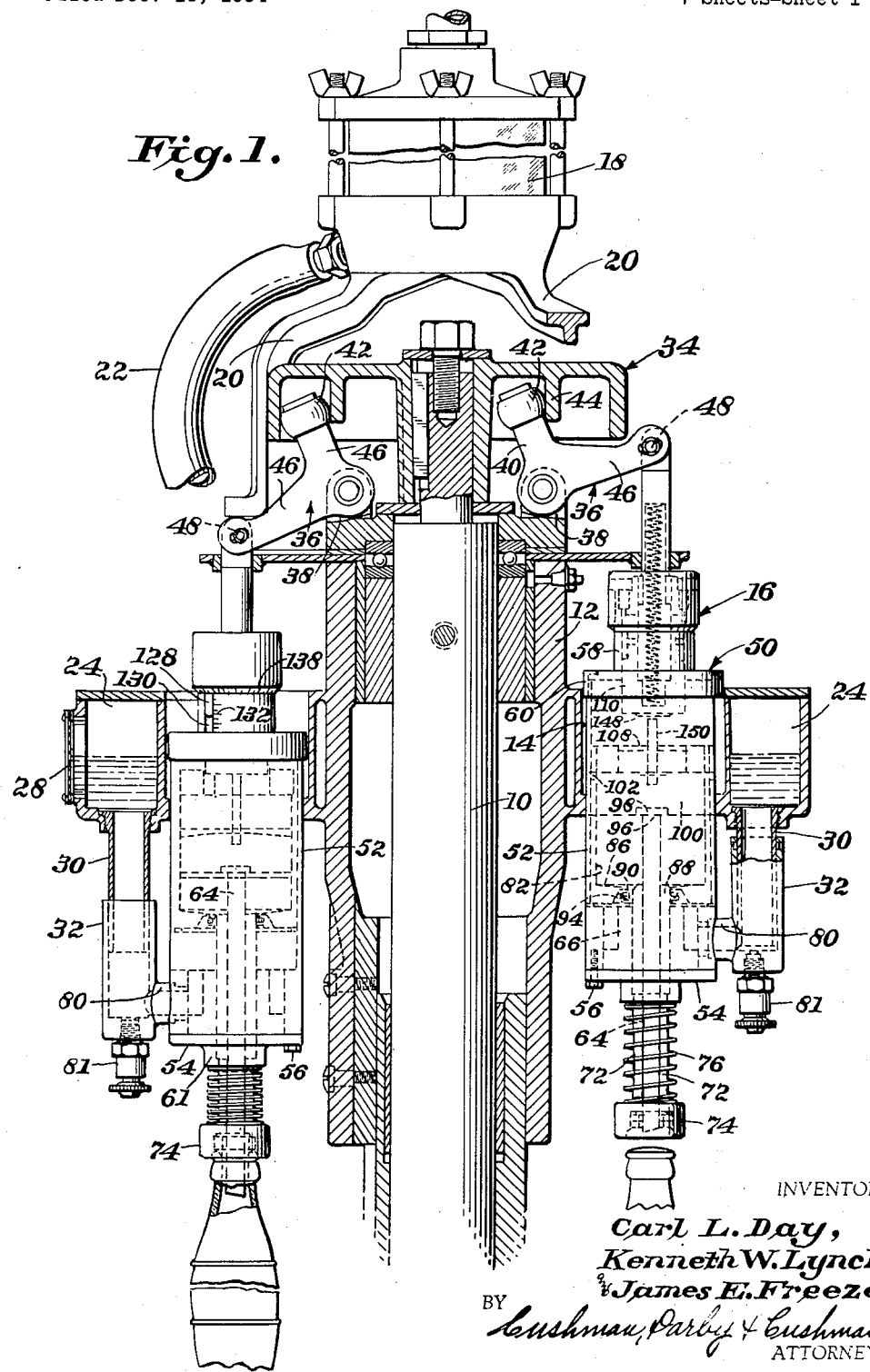

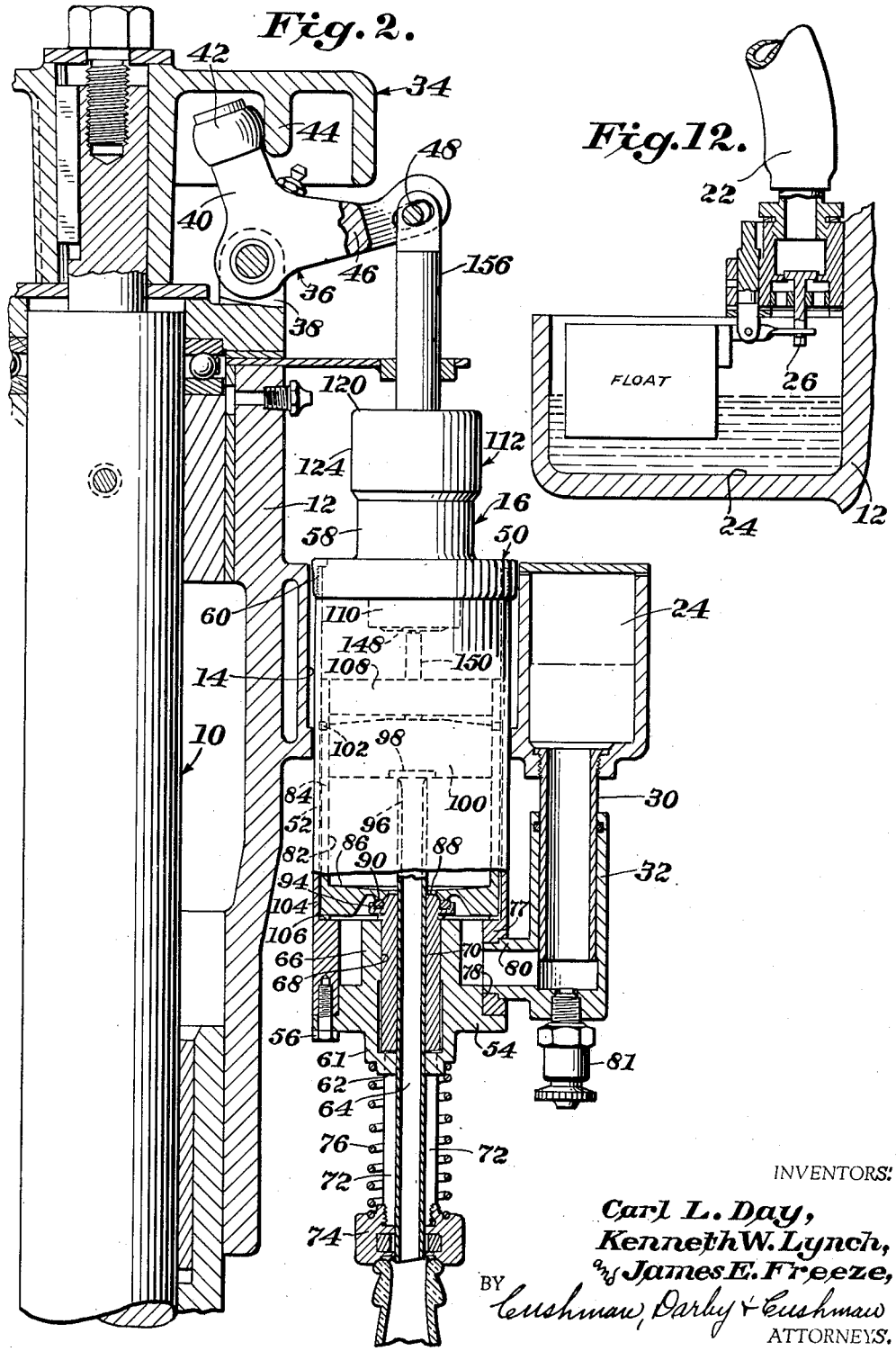

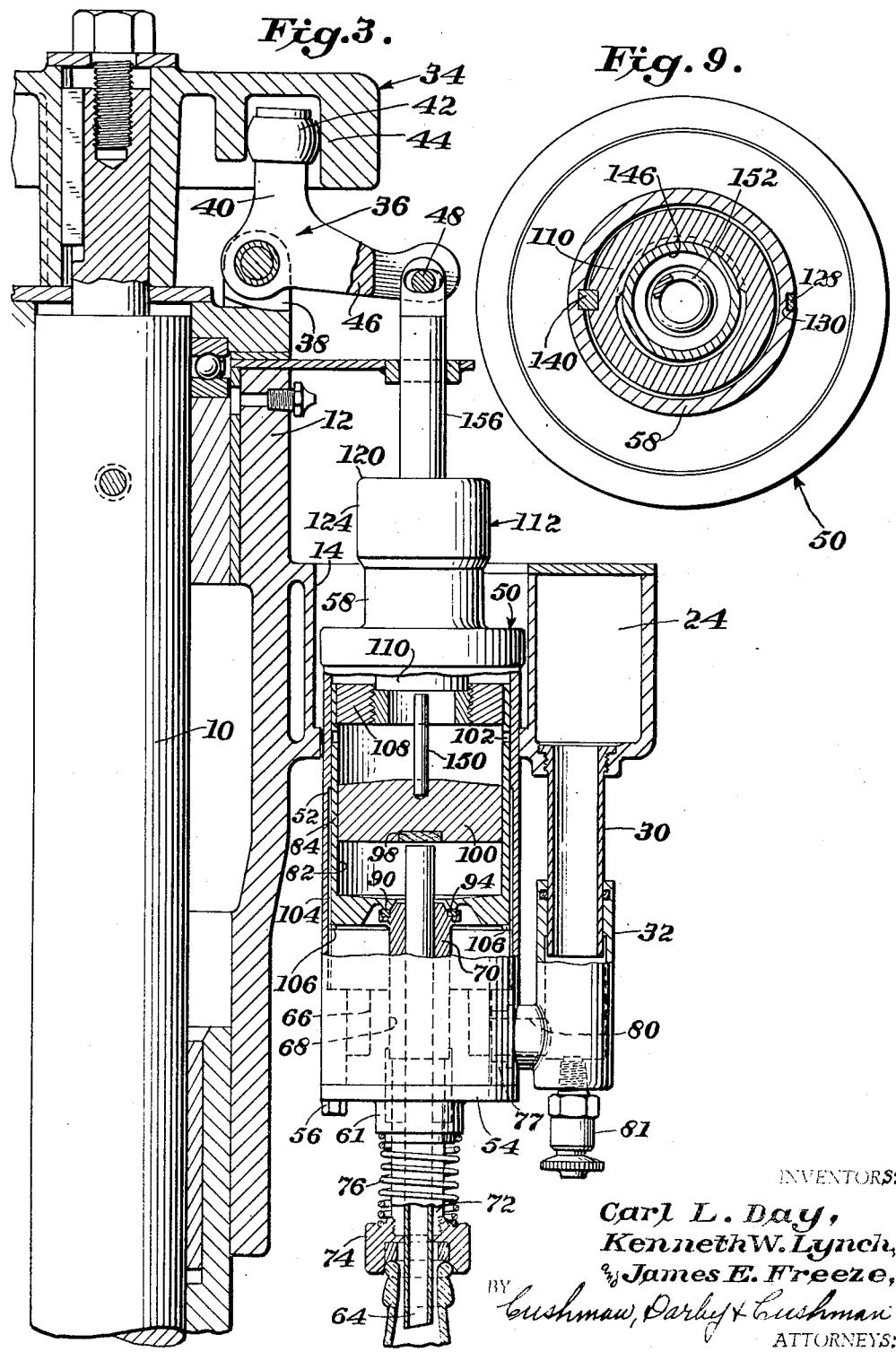

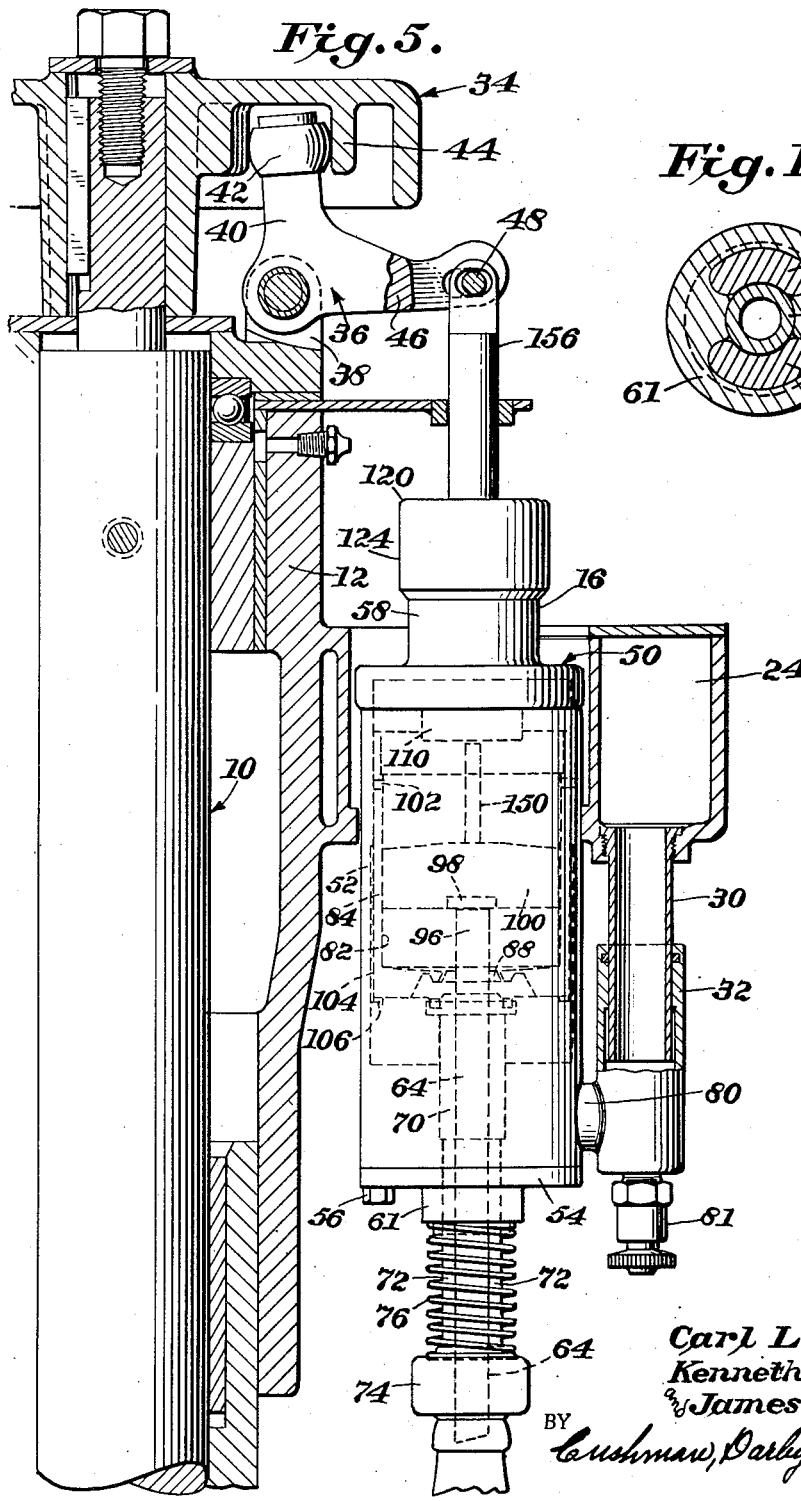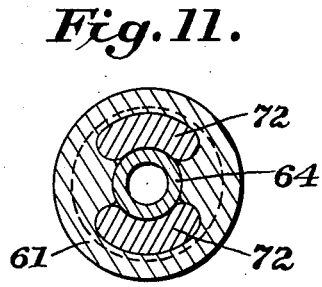

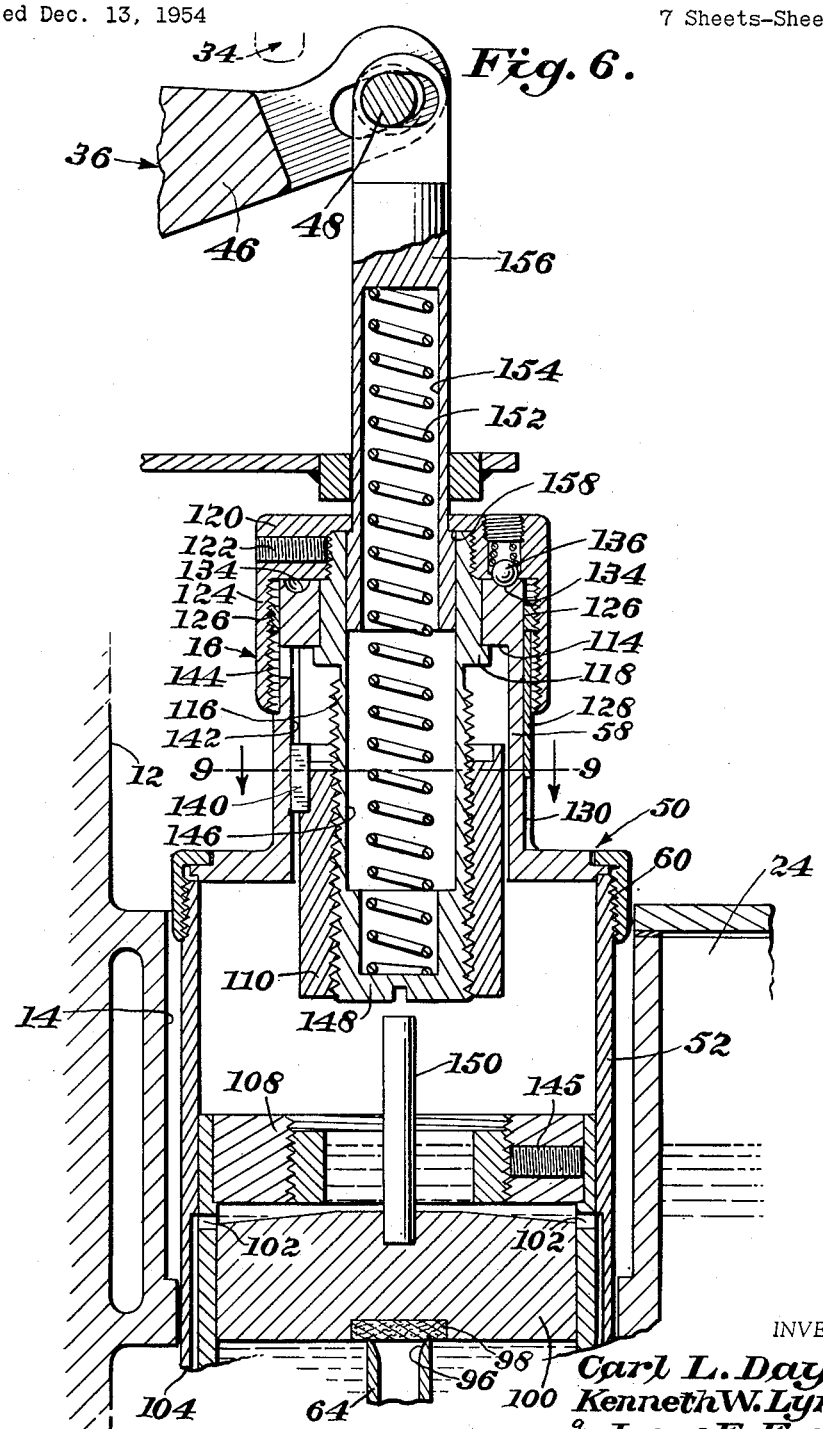

March 26, 1957 C. L. DAY ET AL 2,786,601
CONTAINER FILLING APPARATUS
Filed Dec. 13, 1954 7 Sheets-Sheet 7

INVENTORS:
Carl L. Day,
Kenneth W. Lynch,
James E. Freeze,
BY Cushman, Darby & Cushman
ATTORNEYS.

United States Patent Office 2,786,601
Patented Mar. 26, 1957

2,786,601

CONTAINER FILLING APPARATUS

Carl L. Day, Kenneth W. Lynch, and James E. Freeze, Baltimore, Md., assignors to Crown Cork & Seal Company, Inc., Baltimore, Md., a corporation of New York Application December 13, 1954, Serial No. 474,918

20 Claims. (Cl. 222—50)

This invention relates to container filling apparatus and more particularly to apparatus for filling liquids, such as syrup or the like, in bottles so as to insure that each bottle will receive an accurate measured amount thereof.

In the modern bottling plants utilizing assembly line techniques, it is important that the filling apparatus be capable of delivering to each bottle an accurate measured charge. Various apparatus have been proposed which measure the charge in the bottle itself by gauging the level to which they are filled. However, due to the varying internal measurements in bottles of the same rated capacity, this method has not proved sufficiently accurate or economical.

The filling machines used which are capable of delivering a predetermined charge to each bottle include a syruping mechanism provided with a measuring chamber which must be filled from a supply means and emptied into the bottle during each cycle of operation. The filling of the measuring chamber has presented many problems which have not been adequately solved in the known machines of this type. One arrangement requires that the liquid be fed into the mechanism under a relatively high pressure. While this arrangement enables the machine to operate at high speeds and secures accuracy in measurement, because of the operating liquid pressures involved, it is necessary to provide within the chamber sealing elements, such as cup leathers or the like, which tend to leak and become sticky and are difficult to clean and sterilize. Where the liquid is not introduced into the measuring chamber under pressure this disadvantage is easily overcome, however, the present machines utilizing a relatively low liquid feed pressure have not proven sufficiently accurate nor are they capable of operating at sufficiently high speeds.

Accordingly, it is an object of the present invention to provide a filling apparatus having an improved means for supplying liquid to the measuring chamber which is quick in operation, does not require a high liquid supply pressure and insures a high degree of accuracy.

In its broadest aspects, the invention contemplates the provision of a measuring chamber which is filled through its lower portion by means incorporated therein operable to open by the action of apparatus itself upon the liquid during its cycle of operation. More specifically, a pair of overlapping members define the lower wall of the measuring chamber and during their movement toward the upper discharge opening, they are operable to empty a measure charge of liquid therethrough into the container. It is preferable that the portion of the apparatus below the pair of members include a confined space within which the supply liquid enters during the above discharge movement. The entering liquid contacts the lower surface of the members so as to retard the motion of the upper freely floating member thereby permitting relative motion between the two so that the liquid may enter therebetween into the measuring chamber. In this manner the supply of liquid need not be under a high head or external pressure, since the action of the apparatus itself will draw the same into the measuring chamber by a pump-like action.

Another object of the present invention is the provision of a filling apparatus having improved means for varying the quantity of charge dispensed which may be easily and speedily adjusted whereby various accurate amounts of liquid may be filled into the containers.

A further object of the invention is the provision of an improved quantity adjusting means having visible indicia which accurately indicate the exact quantity of liquid dispensed.

A still further object of the present invention is the provision of an improved filling head which may be operated at high speeds and temperatures, may be easily cleaned and sterilized and which insures accuracy of measure.

A still further object of the invention is the provision of a filling head which is simple in construction, easy to operate and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

Figure 1 is a vertical cross-sectional view of a syruping machine embodying the principles of the present invention;

Figure 2 is a vertical cross-sectional view of one of the filling heads of the machine illustrating the same as it initially contacts the bottle;

Figure 3 is a view similar to Figure 2 showing the filling head with the measuring bowl initially in engagement with the adjustable stop means;

Figure 4 is a view similar to Figure 2 showing the bell crank at its lowermost point;

Figure 5 is a view similar to Figure 2 showing the filling head as the same moves initially upwardly;

Figure 6 is an enlarged fragmentary view of the upper portion of the structure shown in Figure 2;

Figure 9 is a cross-sectional view taken along the line 9—9 of Figure 6;

Figure 10 is a cross-sectional view taken along the line 10—10 of Figure 7;

Figure 11 is a cross-sectional view taken along the line 11—11 of Figure 7; and

Figure 12 is a fragmentary vertical sectional view showing the float operated valve for controlling the flow of syrup from the main tank and maintaining a constant syrup level in the auxiliary tank.

Figure 7:
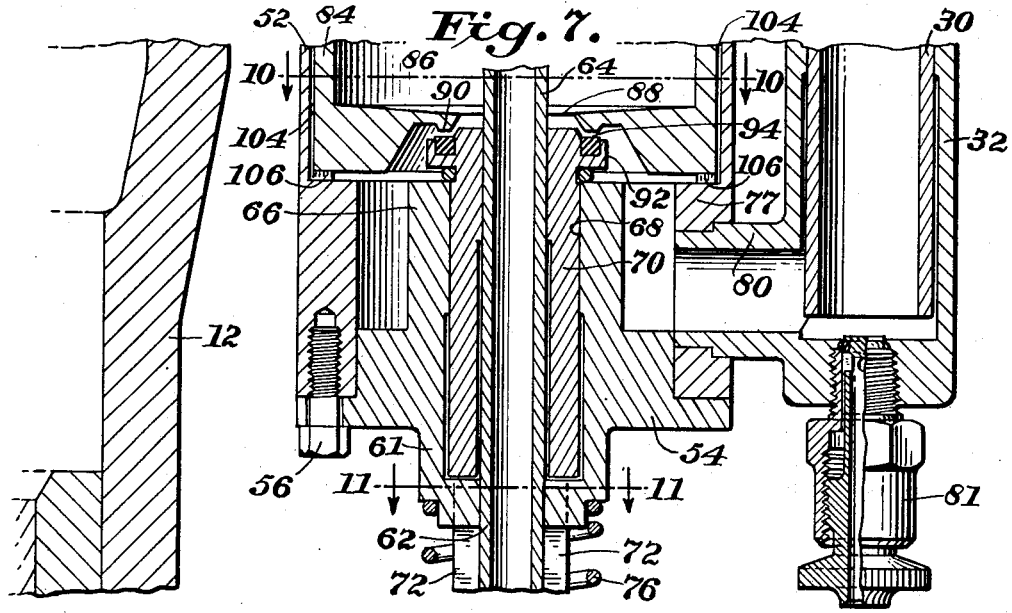
Figure 7 is an enlarged fragmentary view of the lower portion of the structure shown in Figure 2.
Figure 8:
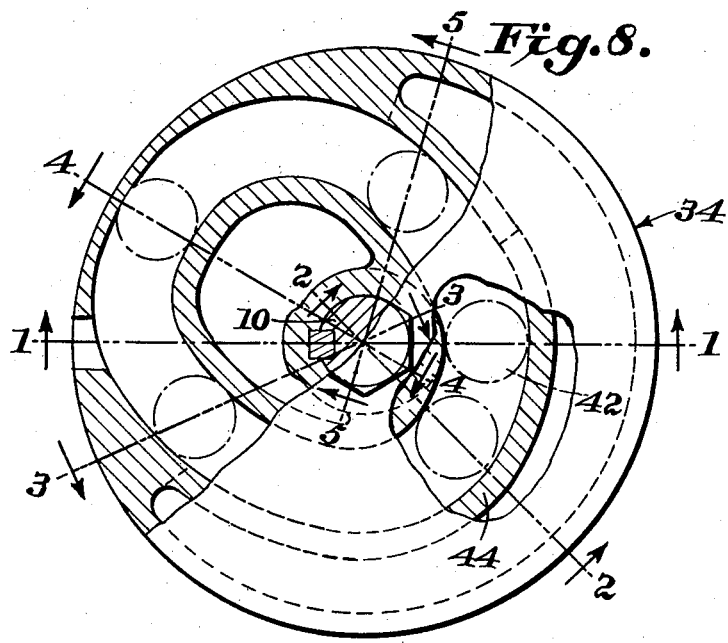
Figure 8 is a plan view partly in section of the cam plate showing substantially the positions of the upper bell crank arm when the filling head is in the positions shown in Figures 1–5.

Referring now more particularly to the drawings, the invention shown in Figure 1 as embodied in a turret type rotary syruping machine such as are usually employed in filling syrup in soft drink bottles. It will be understood, however, that the invention is applicable to machines utilized for completely filling a container, such as liquor bottles and the like, and for other analogous uses.

The syruping machine may comprise a central upright stationary shaft 10 about the upper end of which a frame 12 is rotatably mounted. The frame 12 is preferably provided with a number of annularly spaced, vertically extending openings 14, the exact number of which will depend upon the capacity of the machine. Each of the openings 14 supports a filling head 16 for vertical reciprocation with respect thereto.

In accordance with the usual practice, the main supply of syrup is from a storage tank, not shown, positioned above the machine. Syrup from the storage tank flows by gravity into a reservoir or main tank 18 having the usual glass walls in order that its contents may be observed. The main tank 18 may be mounted on the frame 12 for movement therewith by suitable arms 20 and a hose 22 leading from the main tank directs the syrup into an auxiliary annular tank 24 formed in frame 12 and surrounding the shaft 10. As shown in Figure 12, a suitable float controlled valve 26 may be positioned at the entrance to the auxiliary tank so as to control the flow of syrup from the main tank and to maintain a relatively constant syrup level within the auxiliary tank. If desired, the auxiliary tank may be provided with a suitable glass section 28 so that its contents may be observed. A plurality of annularly spaced tubes 30 extend downward from the auxiliary tank adjacent each opening 14 and have their lower ends telescopically engaged with associated tubes 32 carried by each of the filling heads. The lower end of each of the tubes 32 is secured to the lower end of its associated filling head so as to feed syrup to the bottom portion thereof.

The frame 12 may be rotated by the usual power means, not shown, and a bottle supporting frame, not shown, is preferably disposed therebelow to be rotated therewith as is the customary practice. In order to vertically reciprocate each filling head during the rotation of the frame, a circular cam plate 34 may be fixedly mounted on the upper end of the stationary shaft 10 and a plurality of annularly spaced bell cranks 36 are suitably pivoted, as by lugs 38, on the frame 12 adjacent each filling head. As shown in Figure 1, each bell crank may include an upwardly extending arm 40, the upper end of which is provided with a rotary sleeve 42 engaging in a cam track 44 on the cam plate and an outwardly extending arm 46, the outer end of which is suitably connected with the associated filling head, as by a pin and slot connection 48. In accordance with the design of the cam track 44 each filling head is thus caused to reciprocate vertically once for each single rotation of the frame as will be explained in detail hereinafter.

While the structure described above follows closely with conventional practice, the same has been modified somewhat so as to accommodate the filling heads 16 which embody the principles of the present invention. However, it is to be understood that the invention is not restricted in its application to the structure shown, but may be supported and operated by other mechanisms and be incorporated therein by means other than vertically reciprocating filling heads. In accordance with the design of the particular mechanism to which this invention is applied, bottles or other containers may be presented for filling by any type of conveyor mechanism or by hand.

Each filling head preferably comprises a body or housing 50 including a central cylindrical body member 52 slidably mounted within the associated opening 14, a lower body member 54 suitably secured, as by bolts 56, to the bottom end thereof and an upper body member 58, suitably secured, as by threaded flange 60, to the top end thereof.

The lower member 54 preferably includes a depending central portion 61 provided with an aperture 62 for receiving a centrally disposed vertically extending discharge tube 64 rigidly secured, as by welding or the like, intermediate its ends within the aperture 62. Disposed above the portion 61 is an enlarged upwardly extending portion 66 having a central bore 68 formed therein within which a stem member 70 surrounding the tube 64 is mounted for vertical sliding movement.

Extending downwardly from the stem 70 through suitable apertures in depending portion 61 of the lower body member 54 is a plurality of annularly spaced rod members 72, preferably formed as an integral part of the stem, and having their lower ends rigidly secured to a conventional centering bell 74 surrounding the lower end of tube 64. A coil spring 76 surrounding rods 72 and tube 64 and connected between the depending portion 61 and bell 74 urges the latter into its lowermost position with respect to the tube.

The lower portion of the central body member 52, coextensive with the lower body member 54, is preferably enlarged as at 77, and provided with a suitable radially extending aperture 78 for fixedly receiving the end of a branch tube 80 extending transversely from the tube 32 so that syrup may flow from the auxiliary tank 24 through the telescoping tubes 30—32 into the space between the body members 52 and 54. If desired, a drain plug 81 may be disposed in the lower end of the tube 32 for draining purposes. A measuring bowl 82 is slidably mounted in body member 52 above the enlarged portion thereof and includes a vertically extending cylindrical wall 84 having its outsurface in sliding contact with the inner surface of the member 52 and a generally horizontally disposed bottom wall 86 provided with a central syrup inlet opening or hole 88 of a diameter greater than the diameter of the tube 64 so that the latter may extend therethrough. Surrounding the inlet opening 88 is a downwardly facing annular valve seat 90 and the upper end of the stem 70 includes an enlarged portion 92 provided with an upwardly facing valve ring member 94 engageable with seat 90 to close inlet opening 88.

The upper end of the discharge tube 64 terminates in a discharge opening or port 96 disposed within the measuring bowl above the bottom wall thereof. The opening 96 of the tube is formed so as to provide a valve seat for receiving a disk shaped valve member 98 carried by a piston-like member 100 slidably mounted within the measuring bowl above the discharge tube. A plurality of radially extending, annularly spaced holes 102 are provided in the walls 84 of the measuring bowl adjacent the upper, outer edge of the member 100 and a corresponding plurality of axially extending, annularly spaced grooves 104 are provided in the inner surface of the body member 52. As shown more clearly in Figure 7, the lower, outer edge of the measuring bowl 82 is adapted to seat on the enlarged portion 77 of the body member 52 and includes recesses 106 which enable the holes 102 to communicate with the syrup supply through the grooves 104 when the measuring bowl is in its lowermost position for a purpose hereinafter to be described.

As will become more apparent hereinafter, the amount of charge filled into the container by each filling head is determined by the distance of relative movement which occurs between the bottom wall of the measuring bowl and the discharge opening 96 of the discharge tube. In order to stop this relative movement at different positions so as to vary the amount of syrup dispensed, an annular stop member 108 is mounted within the upper end of the measuring bowl 82 and a cooperating stop member 110 is mounted within the upper body member 58 for vertical movement by a micrometric adjusting means 112 which will now be described.

As shown in Figure 6, the upper body member 58 is provided with an enlarged inwardly extending, annular shoulder 114 within which an axially disposed, vertically extending member 116 is rotatably mounted. The upper end portion of the member 116 includes an annular flange 118 bearing on the lower surface of the shoulder 114 and is secured to a cap member 120 bearing on the upper surface of the shoulder. The member 116 and cap 120 may be secured together by any suitable means, such as thread and set screw means 122. The cap 120 includes a downwardly extending internally threaded, annular flange 124 within which is threadedly engaged a ring 126 having a downwardly extending pointer 128 slidably mounted in a groove 130 formed in the body member 58. The outer surface of the body member and the pointer are suitably calibrated to provide indicia 132 clearly visible to the operator to indicate the quantity of charge dispensed. In order to obtain fractional readings, the upper surface of the shoulder 114 is preferably provided with a plurality of equally spaced circumferentially arranged indentations 134 and a spring urged ball 136 is carried by the cap for selective engagement in the indentations. The lower edge of the cap is provided with indicia 138 corresponding to the indentations for indicating fractional parts of the indicating means 132.

The stop member 110 is moved by the micrometric adjusting means 112 through its threaded engagement with the lower end of the member 116. The stop member is held against rotation by means of an outwardly extending lug 140 slidably mounted within a groove 142 formed in the inner surface of the body member 58. It is to be noted that the stop member is of a size to permit air within the housing to escape upwardly around the same, and outwardly through a vent hole 144 in the body member 58 past the flange 124.

The stop member 108 preferably includes a pair of threadedly engaged annular elements held in adjusted position by set screw 145. It will be seen that by movement of the elements of the stop member 108, the indicia of the adjusting means may be accurately set at the factory so as to insure a correct reading. It will also be seen that by turning the cap member 120, the stop member 110 will be caused to move vertically by virtue of its threaded engagement with the member 116 and sliding engagement in groove 142. Likewise, the pointer will be caused to move vertically a corresponding amount due to its threaded engagement with the cap flange and its sliding engagement in groove 130.

Each filling head body or housing 50 is connected with its associated bell crank arm 46 by a lost motion connecting means which will now be described. The member 116 is preferably provided with a central, vertically extending bore 146 closed at its lower end, as at 148. It is to be noted that the outer surface of the end 148 provides a stop surface for the upper end of a rod 150 extending upwardly from the piston-like member 100 to limit the movement thereof as will be more fully explained hereinafter. The lower end of a coil spring 152 engages the inner surface of the end 148 and the upper end thereof is disposed within a vertically extending bore 154 formed in a plunger 156. The upper end of the plunger is connected with the outer end of the arm 46 through the pin and slot connection 48 and its lower end extends through a suitable aperture in the cap into the bore 146. As shown in Figure 6, the lower end of the plunger includes a shoulder portion 158 which is spring urged upwardly into engagement with the cap.

Operation

Since the operation of each filling head is the same during one revolution thereof, the operation of but one will be described starting with the bowl in its filled condition at the point where an empty bottle is first introduced on to the supporting frame therebelow. It will be understood, however, that the operation of the machine is continuous and this point is taken as the initial position solely for purposes of convenient description. As shown in the right hand portion of Figure 1 and in Figures 6 and 7, the filling head has been moved into its uppermost position by the bell crank 36 so that the filling head is out of engagement with the bottle. The lower inlet opening 88 is opened by the valve 94 and the discharge opening 96 is closed by valve 98 so that syrup has filled the measuring chamber defined by the measuring bowl 82 and piston-like member 100 in a manner to be more fully described in connection with the later operations of the apparatus. It is also to be noted that syrup is free to enter the housing above the member 100 through recesses 106, grooves 104 and holes 102 so as to seek its own level therein.

As the frame is rotated about the shaft 10, the cam track 44 is operable to move the bell crank arm 46 downwardly thus moving the entire filling head downwardly until the bell 74 engages the top of the bottle so as to halt the movement of the bell, rods 72 and stem 70. Further downward movement will cause the remaining filling head structure to move downwardly with respect to the bell and its associated rigid structure so as to compress spring 76 and bring valve seat 90 into engagement with valve member 94 to close inlet opening 88. This position is shown in Figure 2 and it will be noted that a charge is now entrapped within the measuring chamber and the measuring bowl can no longer move downwardly since it is in engagement with the stem 70.

Further downward movement of the bell crank arm will cause the housing 50 and discharge tube 64 to move downwardly with respect to the stem and measuring bowl. During this movement the entrapped syrup within the measuring chamber will halt the movement of the piston-like member 100 until stop rod 150 engages stop surface 148, thus uncovering discharge opening 96 and permitting syrup to flow from the measuring chamber through the discharge opening out the discharge tube and into the bottle. The relative motion between the measuring bowl and the housing will also cause communication between the grooves 104 and holes 102 to cease so that there will be created a suction-like effect in the space between the bottom wall and the lower body member 54 which will cause the same to be filled with syrup. During this downward movement of the bell crank, relative motion will occur between the housing and bowl until the stop members 108 and 110 engage each other as illustrated in Figure 3. Of course, the point of engagement of the stop members is determined by the setting of the micrometric adjusting means 112, the operation of which has been briefly described above.

The downward movement of the entire housing is halted by engagement of the stop members, through the bell 74, rods 72, stem 70 and bowl 82 so that the syrup above the discharge opening 96 is free to flow therethrough permitting the piston-like member 100 to fall by its own weight and the weight of the syrup thereabove and engage valve member 98 thereon. It is to be noted that the engagement of the valve member 98 on the valve seat of the tube 64 provides a drip free closure of the syrup trapped in the measuring chamber.

The closing of the discharge opening will occur simultaneously with further downward movement of the bell crank arm 46 which will cause the plunger 156 to telescope within the bore 146 against the action of the spring 152 which is considerably stronger than spring 76. The plunger will be depressed until the bell crank arm 46 reaches its lowermost point as shown in Figure 4.

The cam track 44 upon further rotation of the frame will cause bell crank arm 46 to move upwardly which in turn will move plunger 156 upwardly until the enlarged portion 158 engages cap 120 to thereby move the housing upwardly. Figure 5 illustrates the operation of the filling head upon initial upward movement of the housing. It will be noted that spring 76 will maintain bell 74 in engagement with the bottle so that stem 70 is likewise held stationary. As the housing moves upwardly, the syrup, which has been drawn into the bottom portion thereof, contacts the bottom wall of the measuring chamber and tends to carry the same upwardly so as to move the valve seat 90 away from the valve member 94 and open the inlet opening 88. As the housing continues to move upwardly the syrup will continue to flow into the bowl until the latter assumes its lowermost position wherein holes 102 communicate with grooves 104.

It can thus be seen that there has been provided a container filling apparatus which may be operated at high speeds and which is operable to discharge an accurate measured amount of syrup into each container. The apparatus is arranged so that if no bottle is presented, operation of the particular filling head will not occur. Moreover, when the apparatus is stopped, flow will not continue since the discharge opening of each filling head is shut off from communication with the syrup supply source.

A significant feature of the present invention is the fact that the syrup may be fed to each head at a relatively low pressure and therefore it is not necessary to provide cup leathers between the relatively movable parts of the measuring bowl. This enables syrups to be maintained at higher operating temperatures and permits ready sterilization without fear of damage. In this regard, it is to be noted that the apparatus may be quickly and easily drained by opening of the drain plugs 81 and that through holes 102 the syrup above member 100 may be easily drained off. Furthermore, the filling of the measuring chamber of the apparatus does not merely depend upon the flow by gravity of a relatively low head of syrup, but rather provides a pump-like action through the operation of the working parts of each filling head itself which enables quick recharging of the measuring chamber so that high speed operation is possible.

Another significant feature of the present invention is the speed and ease in which the amount of charge filled into the container may be varied. With the present invention it is necessary merely to turn the cap 120 to the desired setting as indicated by the indicia 132 and 138 to determine accurately the exact amount of syrup discharged. No complicated adjustment of the length of stroke or other adjustment is needed. The stroke of the motion transmitting means of the present invention is maintained constant and through the spring pressed lost motion connection compensation for the different settings of the stop members is automatically assured.

It will be understood that the invention is not limited to the details of construction shown in the drawings and that the examples of the use of the apparatus which have been given do not include all of the uses of which it is capable; also, that the phraseology employed in the specification is for the purpose of description and not of limitation. Many variations will occur to those skilled in the art which are within the spirit of the invention and the scope of the appended claims.

We claim:

1. An apparatus for filling liquid into containers comprising a measuring bowl including a bottom wall having an inlet port therein, a tube extending through said bottom wall, said tube having a discharge port therein spaced above said bottom wall, said bottom wall and said discharge port being relatively movable toward and away from each other, and means operable to close said inlet port during the relative movement of said bottom wall and said discharge port toward each other.

2. Apparatus of the character described in claim 1 including an upper end member mounted within said measuring bowl adjacent said discharge port, said member being normally biased to close said discharge port and operable during the relative movement of said bottom wall and said discharge port toward each other to open the latter.

3. Apparatus of the character described in claim 1 including adjustable means for stopping the relative movement of said bottom wall and said discharge port toward each other at one of a plurality of different positions.

4. Apparatus of the character described in claim 3 wherein said adjustable means includes a micrometric adjustment.

5. An apparatus for filling liquid into containers comprising means defining a measuring chamber including a bottom wall and a discharge port spaced above said bottom wall, motion transmitting means for effecting a relative vertical reciprocation between said bottom wall and said discharge port, said motion transmitting means having a vertical stroke of substantially constant distance, adjustable means for controlling the distance of the vertical stroke between said bottom wall and said discharge port in accordance with the amount of liquid desired to be filled into a container, said motion transmitting means being operative to relatively move said bottom wall and said discharge port through their entire vertical stroke during only a portion of the vertical stroke of said motion transmitting means, and lost-motion means operable during the remaining portion of the vertical stroke of said motion transmitting means.

6. Apparatus of the character described in claim 5 wherein said measuring chamber defining means is mounted for vertical reciprocation and wherein said lost-motion means comprises a spring urged telescopic link connected between said motion transmitting means and said measuring chamber defining means.

7. Apparatus of the character described in claim 6 wherein said adjustable means includes a micrometric adjustment.

8. An apparatus for filling liquid into containers comprising a housing adapted to retain liquid in its bottom portion, a vertical tube rigidly secured to said housing, said tube including an upper end portion within said housing having a discharge port therein, a pair of members mounted within said housing, one of said members having a lower portion spaced below an overlapping portion of the other of said members so as to define an inlet opening therebetween, said one member being movable toward said discharge port whereby said lower portion engages said overlapping portion to close said inlet opening and carry said other member with it toward said discharge port, said members together defining a measuring bowl having a bottom wall and an outer wall extending upwardly therefrom.

9. Apparatus of the character described in claim 8 wherein said other member comprises the greater portion of the bottom wall of said measuring bowl whereby the liquid in the housing offers a greater resistance to said other member than said one member during their movement away from said discharge port.

10. Apparatus of the character described in claim 8 wherein said housing includes a chamber snugly receiving said measuring bowl having an opening in its bottom for receiving liquid therein.

11. Apparatus of the character described in claim 8 including an upper member mounted for sliding movement within the outer wall of said measuring bowl, said upper member having a portion movable into and out of engagement with said discharge port.

12. Apparatus of the character described in claim 9 including adjustable means for stopping the movement of said measuring bowl toward said discharge port at one of a plurality of different positions.

13. An apparatus for filling liquid into containers comprising means defining a measuring chamber having a discharge port for communication with one end portion thereof, said means including a first end member movably mounted adjacent said discharge port for opening and closing the latter and a second end member having an inlet port therein, said second end member and said discharge port being relatively movable toward and away from each other, and means operable to close said inlet port and entrap a charge of liquid within said chamber, said first end member being mounted for movement by said entrapped liquid into a position opening said discharge port upon relative movement of the latter and said second end member toward each other with said inlet port closed.

14. An apparatus for filling liquid into containers comprising a housing adapted to retain liquid in its bottom portion, a vertical tube rigidly secured to said housing, said tube including an upper end portion within said housing having a discharge port therein, a measuring bowl mounted within said housing for vertical reciprocation toward and away from said discharge port, said measuring bowl including a bottom wall having an inlet opening therein, and a bowl moving member having a portion disposed below said bottom wall movable into closing engagement with said inlet opening.

15. An apparatus for filling liquid into containers comprising a housing, upper and lower end members mounted in said housing and defining a measuring chamber therebetween, a tube carried by said housing having an upper portion extending through said lower end member into said chamber and provided with a discharge port adjacent said upper end member, an inlet port in said bottom wall, a member carried by said housing for vertical reciprocation with respect thereto, said member being disposed below said bottom wall adjacent said inlet port and being operable upon upward movement with respect to said housing to close said inlet port and move said bottom wall upwardly with respect to said discharge port, and valve means operatively associated with said discharge port operable to open during said upward movement of said bottom wall.

16. A filling head comprising a housing having a vertically extending tube rigidly secured thereto intermediate its ends, said tube having a discharge port in its upper end portion and being open at its lower end, an upper measuring chamber defining member movably mounted within said housing adjacent the upper end portion of said tube, said upper member having a portion for opening and closing said discharge port, a lower measuring chamber defining member movably mounted within said housing below said upper member, an inlet opening in said lower member through which the tube extends, and a plunger movably mounted in said housing, said plunger having a portion surrounding said tube below said lower member movable into closing engagement with said inlet opening.

17. A filling head comprising a housing including walls defining an inner cylindrical chamber and an opening in its bottom portion communicating with said chamber for supplying liquid thereto, a vertical tube secured intermediate its ends to the bottom portion of said housing, a measuring bowl slidably mounted in said chamber, said bowl including an outer vertical wall in sliding engagement with the adjacent wall of said chamber and a bottom wall having a central opening therein, the upper end of said tube extending upwardly through said bottom wall and terminating in a discharge outlet, a disk-like member slidably mounted within said bowl and having a central portion for seating on said discharge outlet to close the latter, and a plunger carried by said housing for sliding movement, the upper end of said plunger surrounding said tube and being movable into closing engagement with the central opening in said bottom wall.

18. A filling head of the character described in claim 17 wherein said plunger is rigidly connected with a spring pressed centering bell disposed on the lower end of said tube.

19. A filling head of the character described in claim 17 including adjustable stop means mounted in the upper portion of said housing, said measuring bowl being provided with an upper surface adapted to engage said stop means.

20. A filling head of the character described in claim 17 wherein said adjacent wall of said housing is provided with vertical grooves extending upwardly from the bottom portion of said chamber and wherein said outer vertical wall of said bowl includes transverse apertures above said disk-like member for communicating with said grooves when said bowl is in its lower-most position.

References Cited in the file of this patent
UNITED STATES PATENTS

| | | |
|---|---|---|
| 889,106 | Cunningham | May 26, 1908 |
| 2,029,460 | Brady | Feb. 4, 1936 |